May 2, 1967  A. E. PASCHKIS  3,317,913
MULTI-POINT RECORDERS
Filed May 21, 1965  12 Sheets-Sheet 3
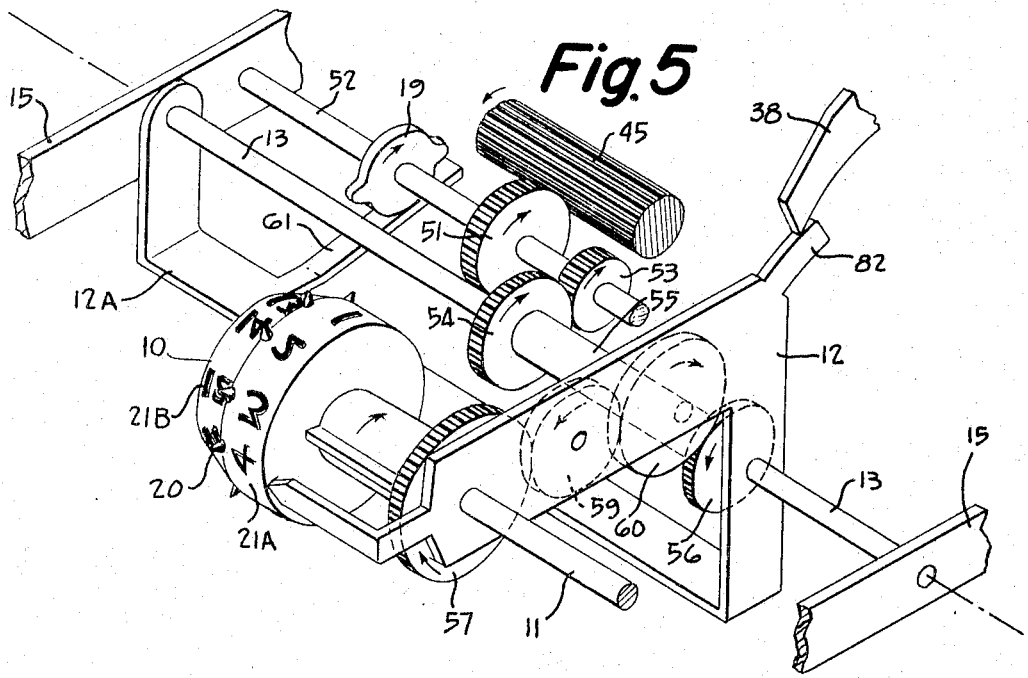
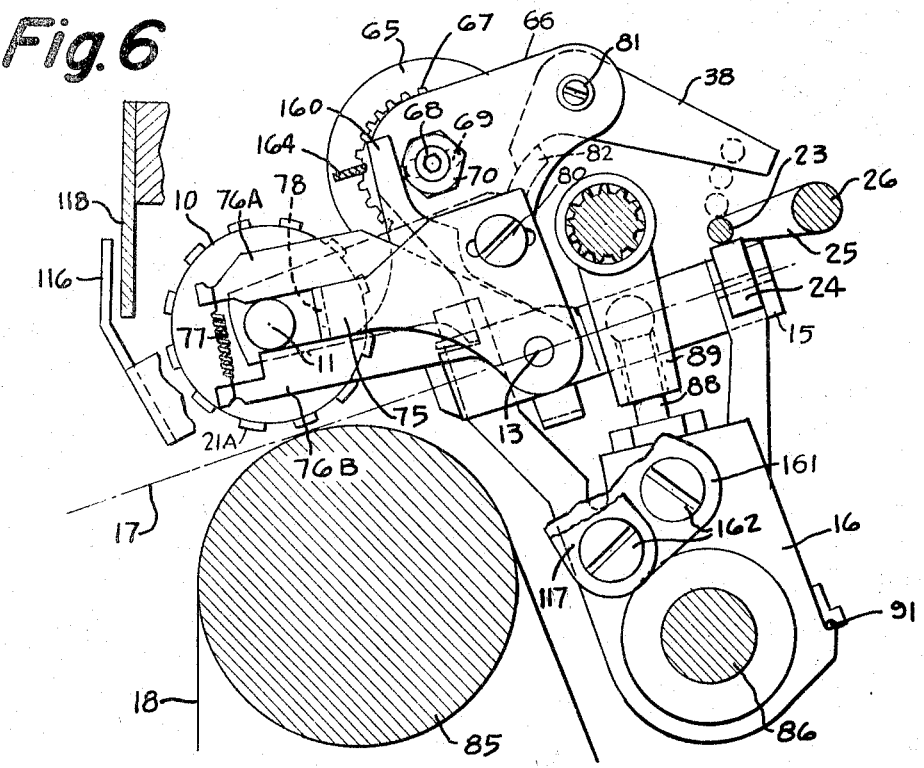

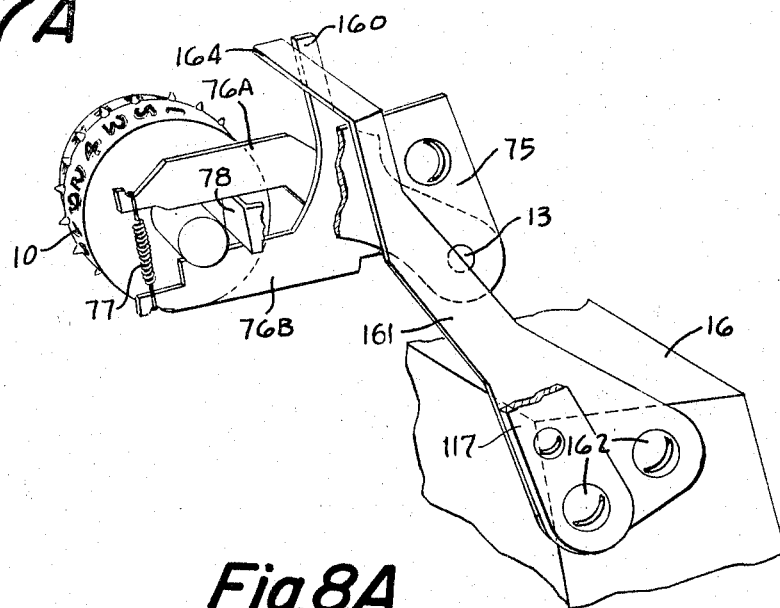
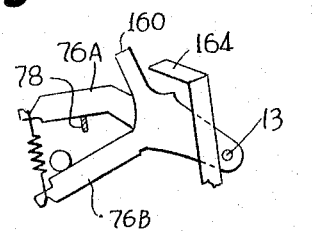
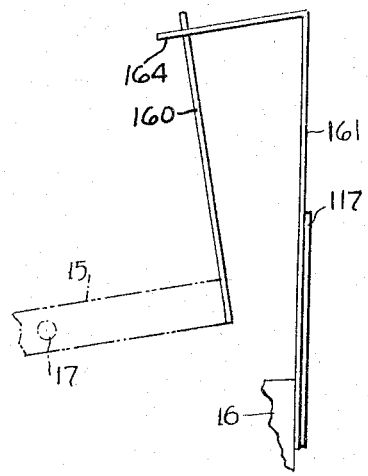
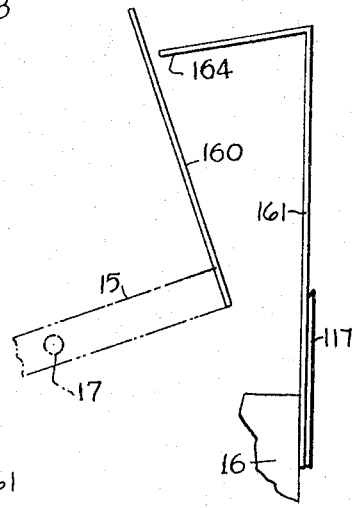
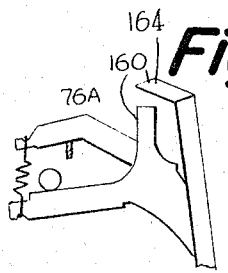
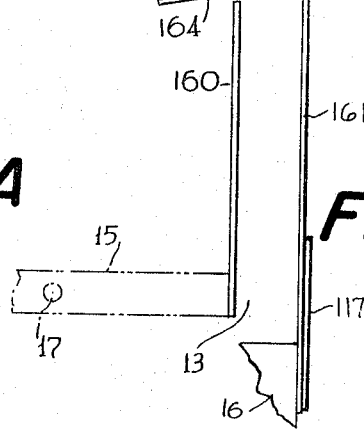

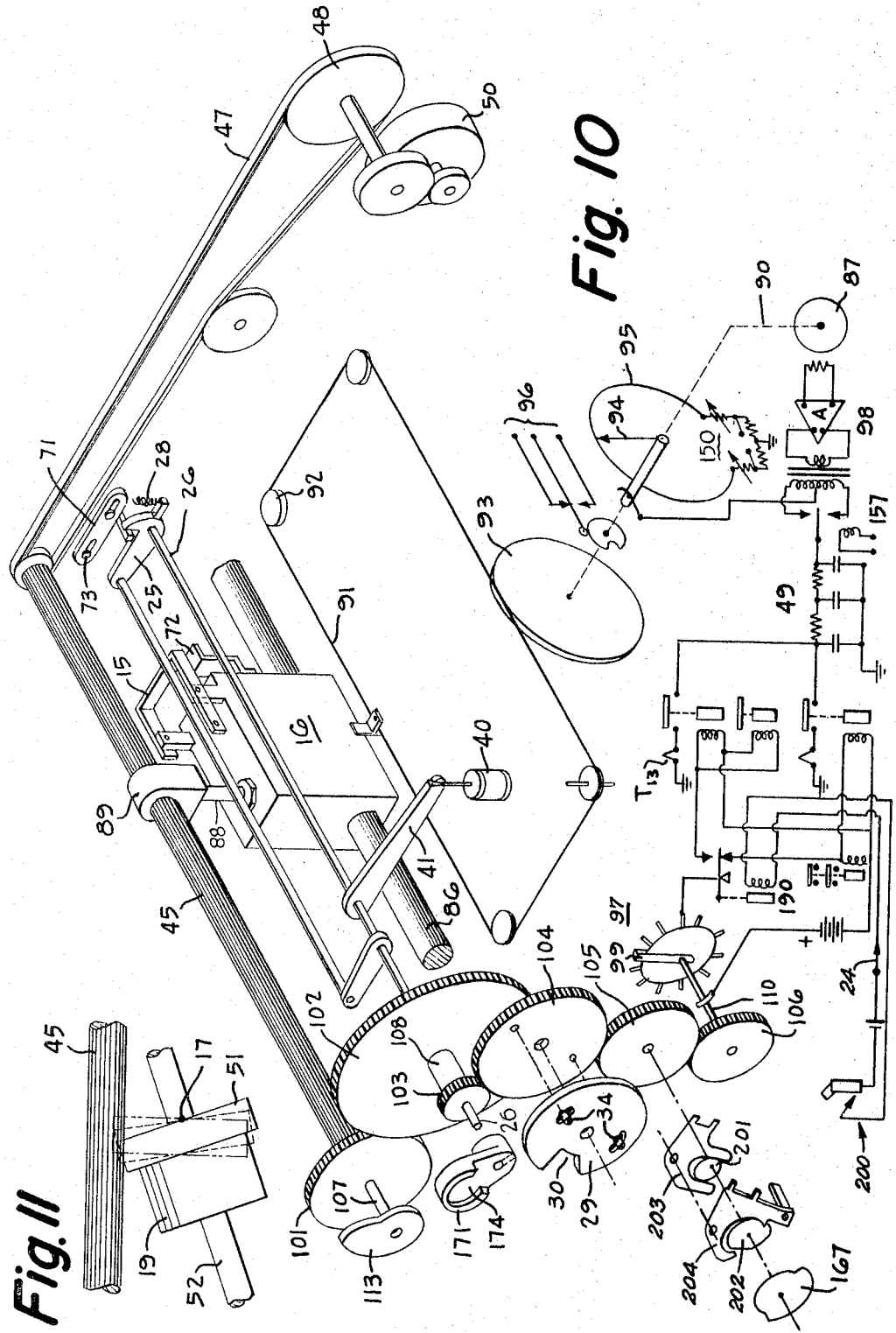

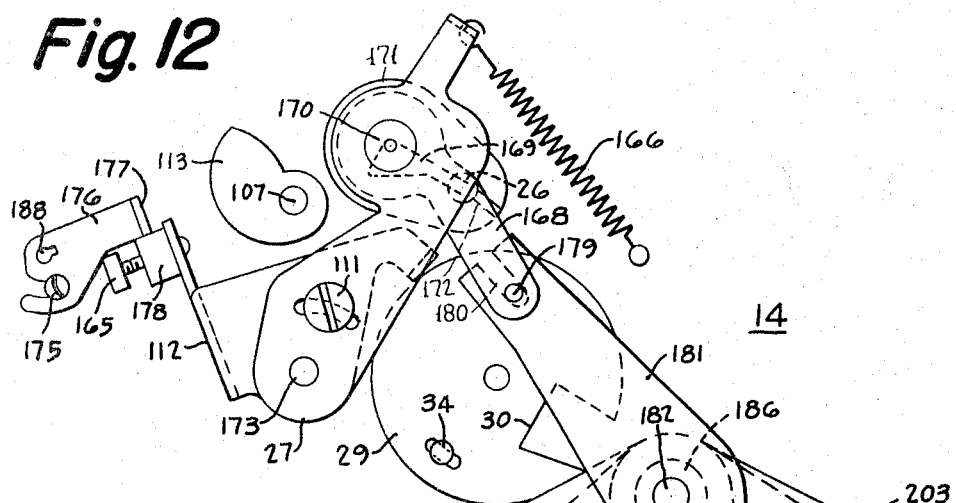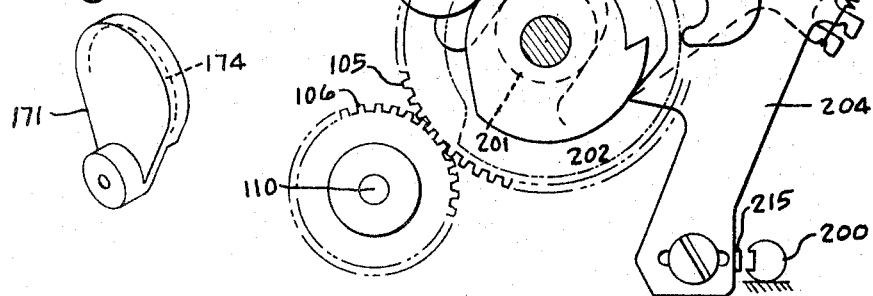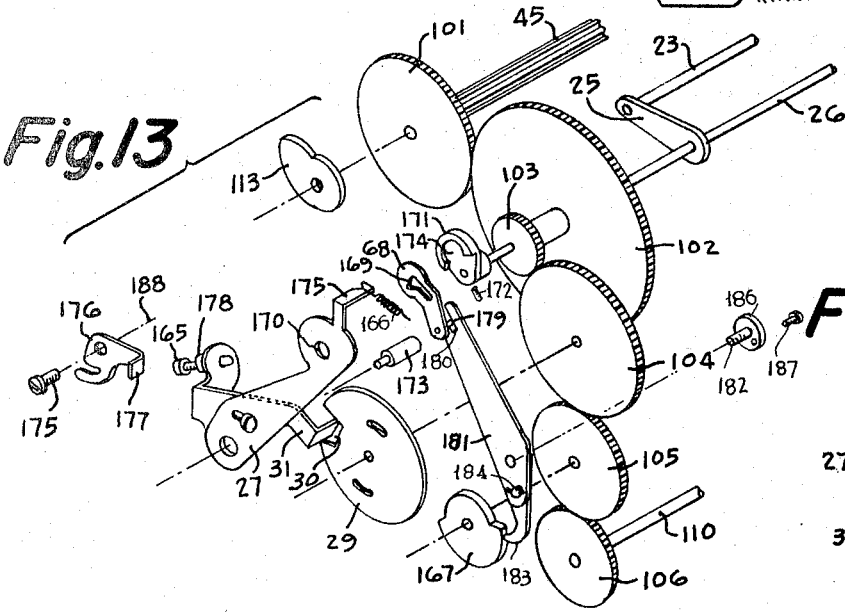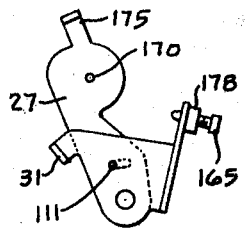

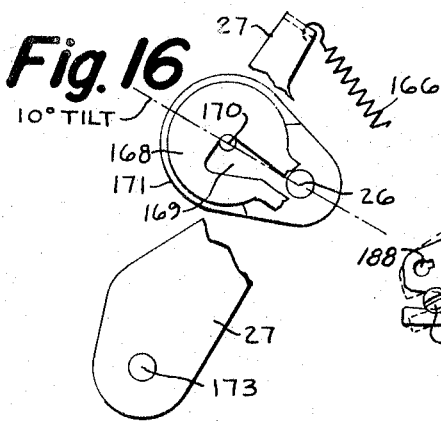
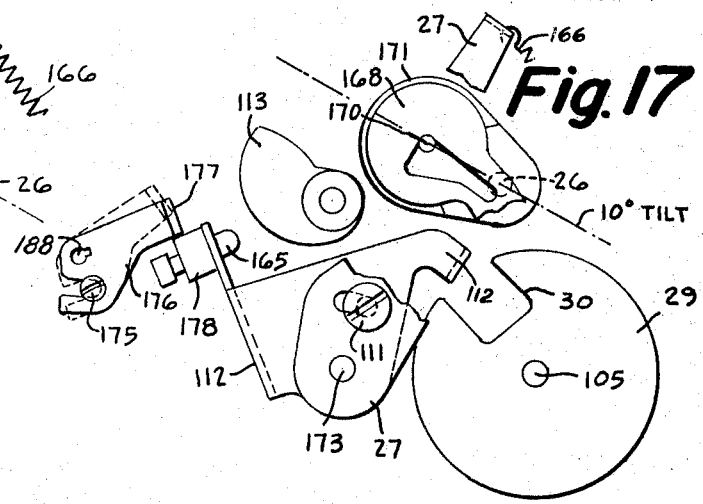
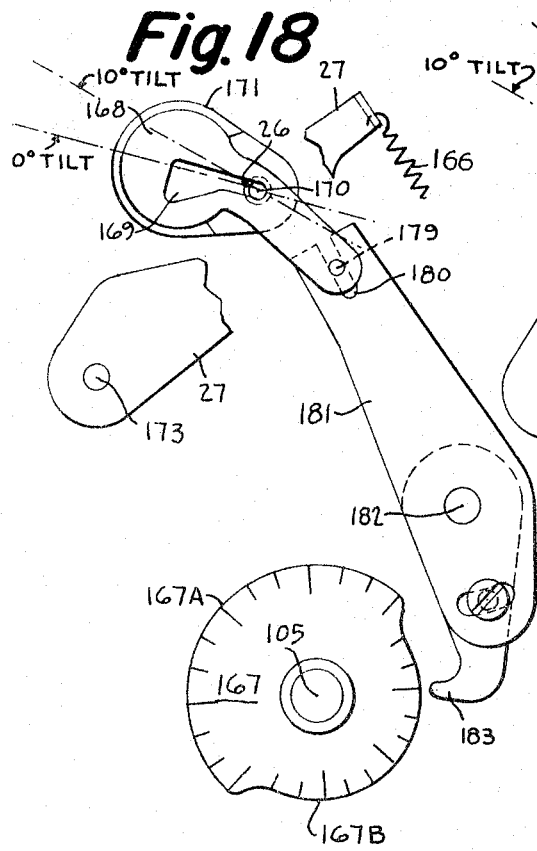
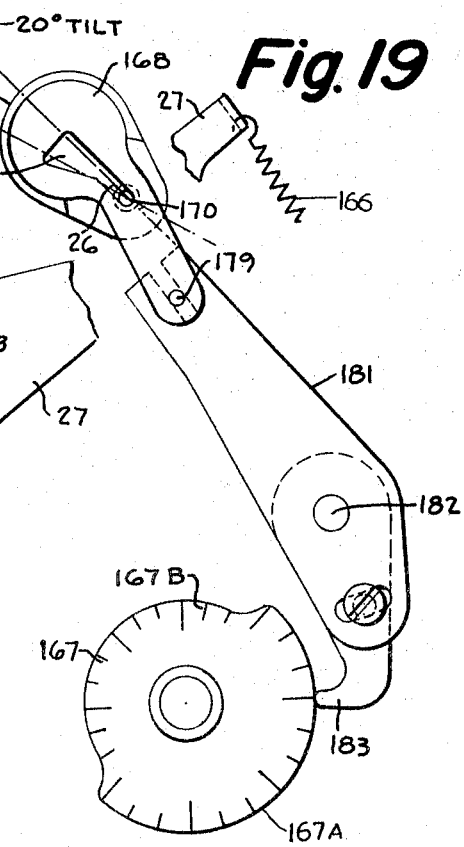

May 2, 1967  A. E. PASCHKIS  3,317,913
MULTI-POINT RECORDERS

Filed May 21, 1965  12 Sheets-Sheet 11

May 2, 1967  A. E. PASCHKIS  3,317,913
MULTI-POINT RECORDERS

Filed May 21, 1965  12 Sheets-Sheet 12

United States Patent Office
3,317,913
Patented May 2, 1967

3,317,913
MULTI-POINT RECORDERS
Albert E. Paschkis, Gwynedd Valley, Pa., assignor to Leeds & Northrup Company, a corporation of Pennsylvania
Filed May 21, 1965, Ser. No. 457,609
21 Claims. (Cl. 346—34)

This invention relates to multiple-point recorders for recording as a function of time the changes in magnitude of a variable, such as temperature, pressure, voltage or the like at various points of a system or process.

In prior recorders such as disclosed, for example, in copending applications Ser. No. 277,995, filed May 6, 1963 upon which Letters Patent 3,195,141 has issued, Ser. No. 353,382, filed Mar. 20, 1964 upon which Letters Patent 3,295,140 has issued and Ser. No. 402,215, filed Oct. 7, 1964, the maximum number of measuring points corresponds with the number of printing positions per revolution of the print wheel and with the number of points per revolution of an input-selector switch driven in synchronism with the print wheel.

In accordance with one aspect of the present invention, the maximum number of measuring points for the same basic recorder mechanism is doubled by providing: (a) a print-selector mechanism which for one series of measuring points corresponding with half the total number thereof sets the axis of the print wheel at one angle for printing from one row of peripherally spaced point-identification symbols and which for a second series, or the other half of the measuring points, sets the axis of the print wheel at a second angle for printing from another peripheral row of different point-identification symbols; and (b) a cam-controlled switch operating in timed relation to the input-selector switch and controlling a two-pole multi-contact relay to connect each point of the input-selector switch to one or the other of two measuring points of the different series thereof.

More specifically in accordance with the present invention, the print-selector mechanism of the 12-point recorder disclosed in the aforesaid copending applications is replaced by a new print-selector mechanism capable of selecting three tilt angles of the point-wheel axis and a cam-controlled switch is added. The new print-selector mechanism and the added switch provide: (a) for printing, in time sequence, of 24 dots corresponding with 24 measuring points; (b) for printing, in time sequence, of the 24 dots with point-identification symbols; (c) for printing, in time sequence, the 24 dots with occasional printing, at predetermined intervals, of the corresponding point-identification symbols; (d) for monitoring, without printing, of up to 24 measuring points; and (e) for conversion to a 12, 6, 4, 3 or 2-point recorder.

The present invention also concerns modification of printing mechanism such as shown in the aforesaid applications to include means which is effective to absorb part of the impact of the print wheel as used to print dots only and which is ineffective when the print wheel is used to print dots with point-identification symbols.

The invention further resides in recorder mechanisms and systems having features of novelty and utility hereinafter described and claimed.

For a more detailed understanding of the invention, reference is made to the following description of a preferred embodiment thereof and to the accompanying drawings in which.

Figure 1:
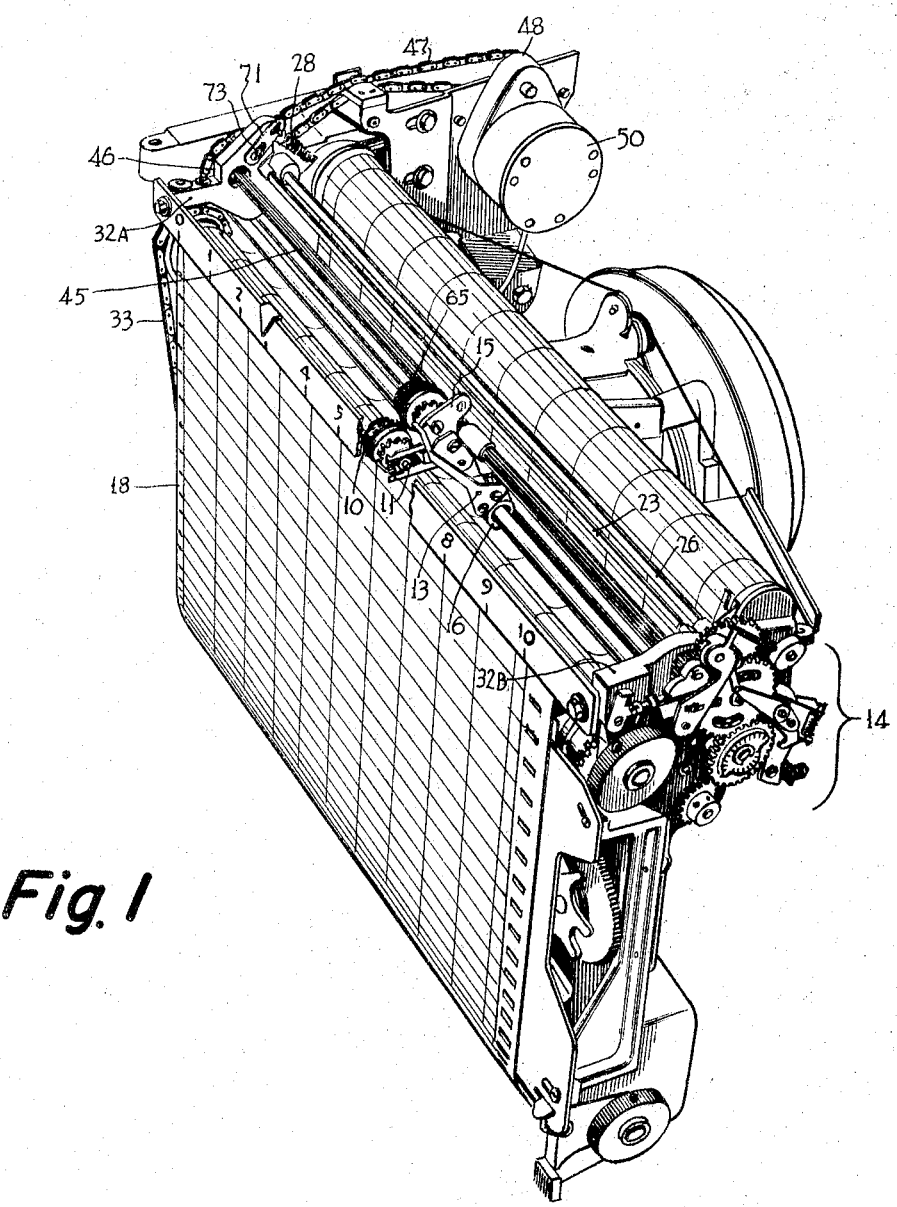
FIG. 1 is a perspective view of a 24-point recorder with its housing omitted for clarity.
Figure 7:
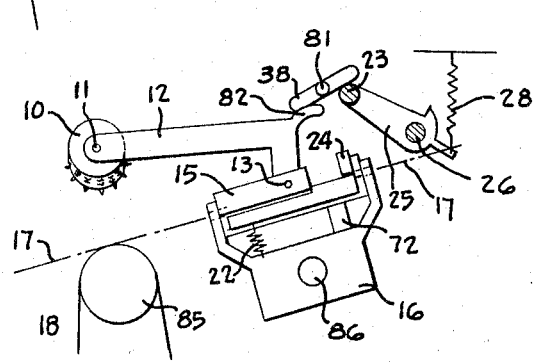
Figure 25A:
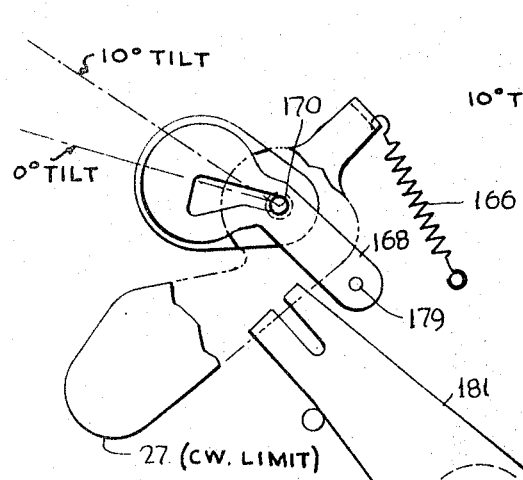
Figure 25B:
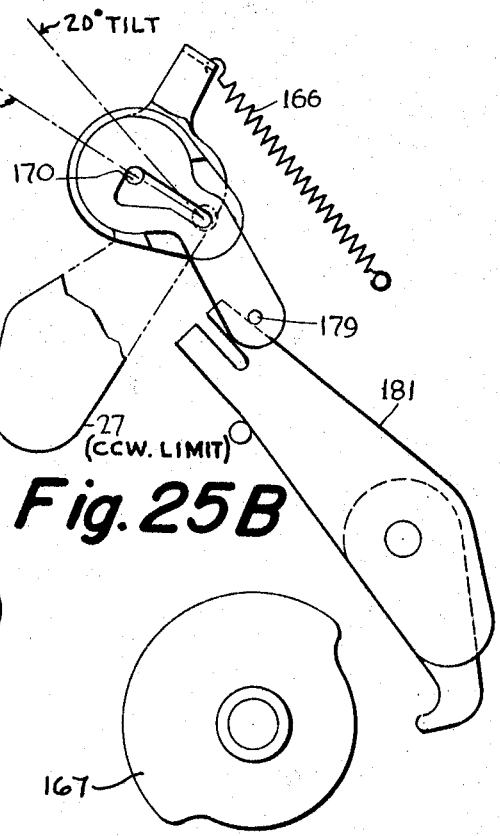
Figure 26:
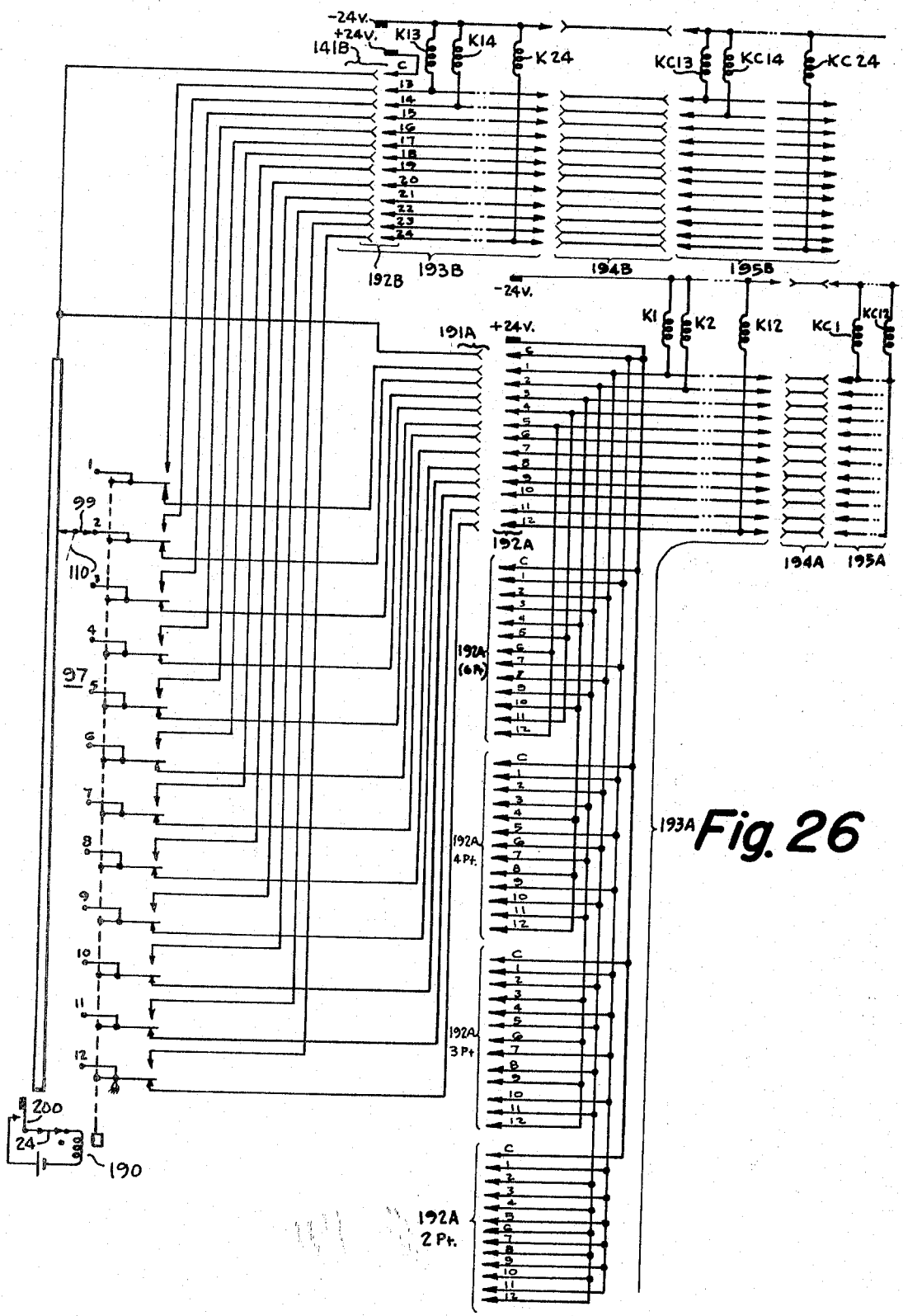

FIG. 5 in perspective schematically shows a gear-train arrangement for advancing the recorder print wheel;

FIG. 6 is a side elevational view, with parts broken away, of the recorder carriage shown in preceding figures;

FIG. 7 is a detail schematical figure referred to in discussion of a print-holdout arrangement;

FIGS. 7A, 7B, 8A, 8B and 9A, 9B are detail schematic figures referred to in discussion of resilient stop structure shown in FIGS. 1 and 6;

FIG. 10 schematically and in perspective illustrates the recorder mechanism of previous figures with associated measuring circuitry and timing cams;

FIG. 11 is a detail view of the gear and cam drive shown in FIG. 5;

FIG. 12 is a side elevational view, on enlarged scale, of the print-selector mechanism and cam-operated switch shown in FIG. 1;

FIG. 13 is an exploded view showing components of the print-selector mechanism of FIG. 12;

FIGS. 14 and 15 are rear views, on enlarged scale, of two of the components shown in FIG. 13;

FIGS. 16 to 24 are explanatory figures referred to in discussion of the relative positions of various components of the print-selector mechanism of FIGS. 12 and 13;

FIGS. 25A, 25B are explanatory figures referred to in adaptation of the recorder for 12-point, 6-point, 4-point, 3-point or 2-point operation;

FIG. 26 schematically illustrates the input-selector switch of the recorder and associated circuitry suitable for 24-point, 12-point, 6-point, 4-point, 3-point or 2-point operation.

Figure 27:
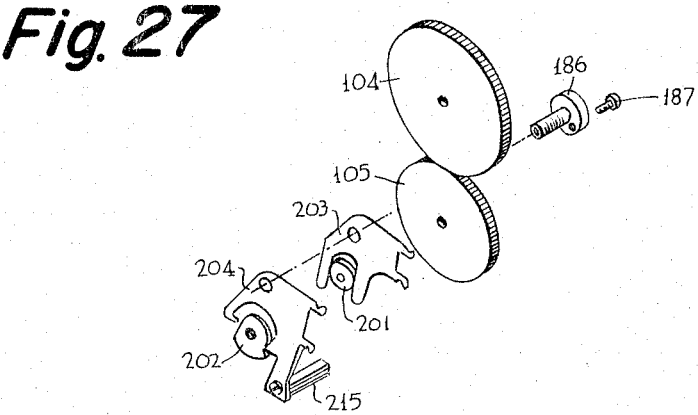
Figure 28:
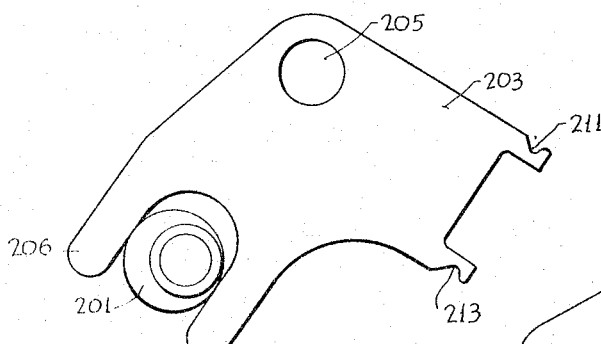
Figure 29:
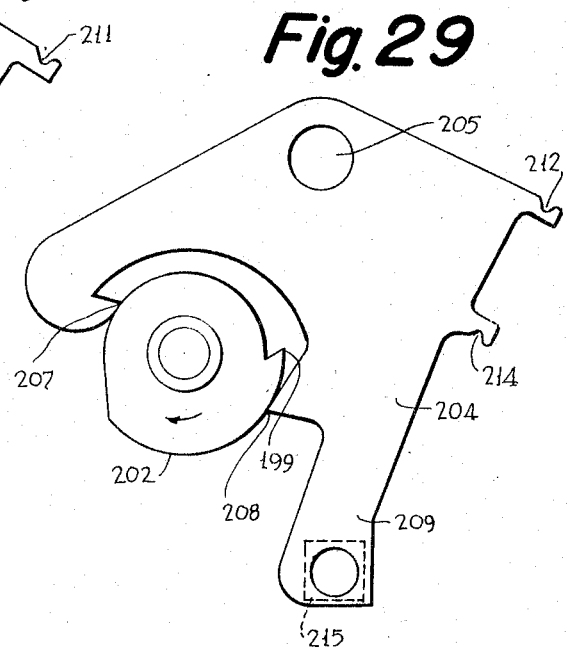
Figure 30:
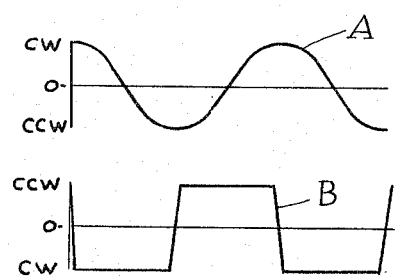
Figure 31A:
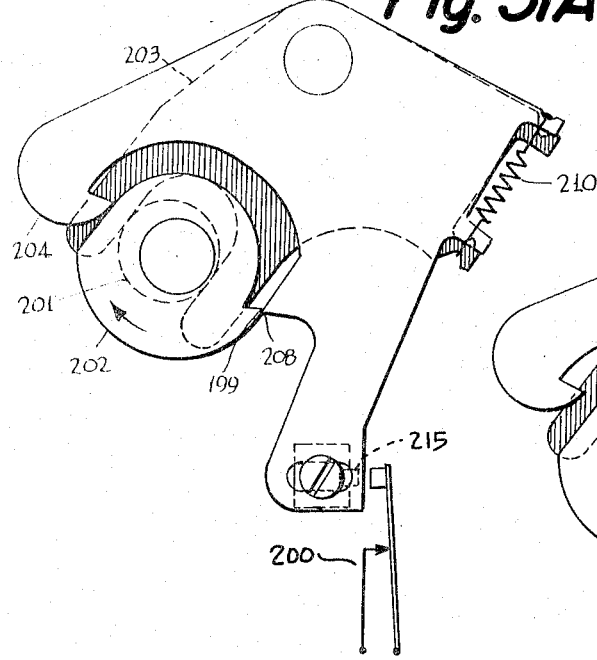
Figure 31B:
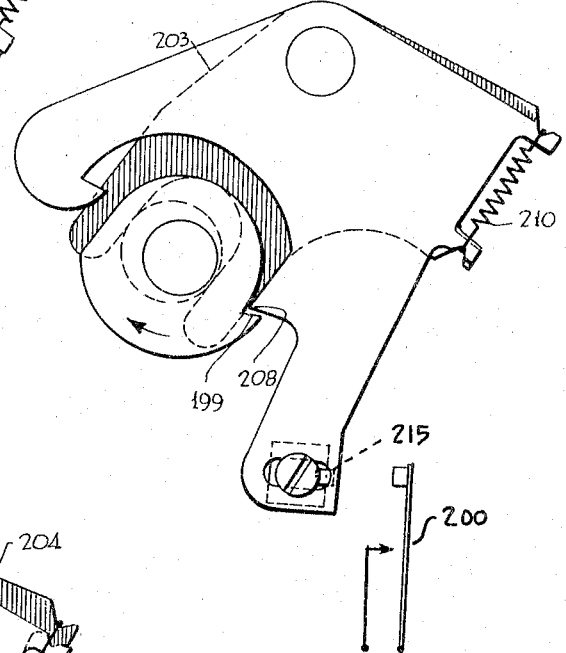
Figure 32A:
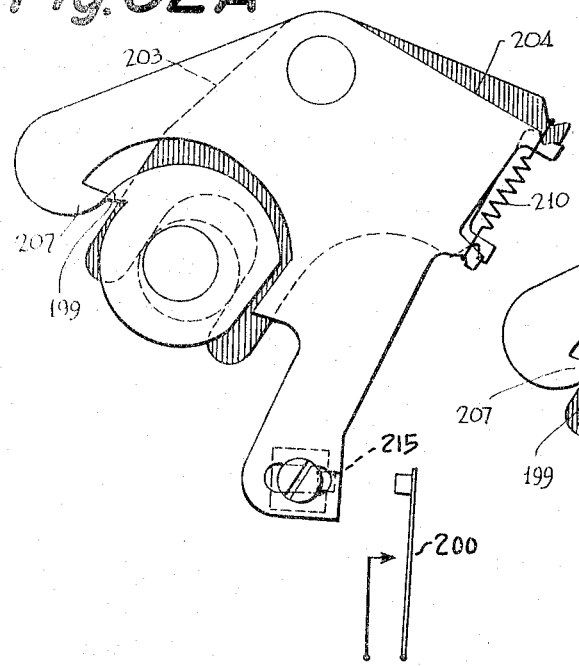
Figure 32B:
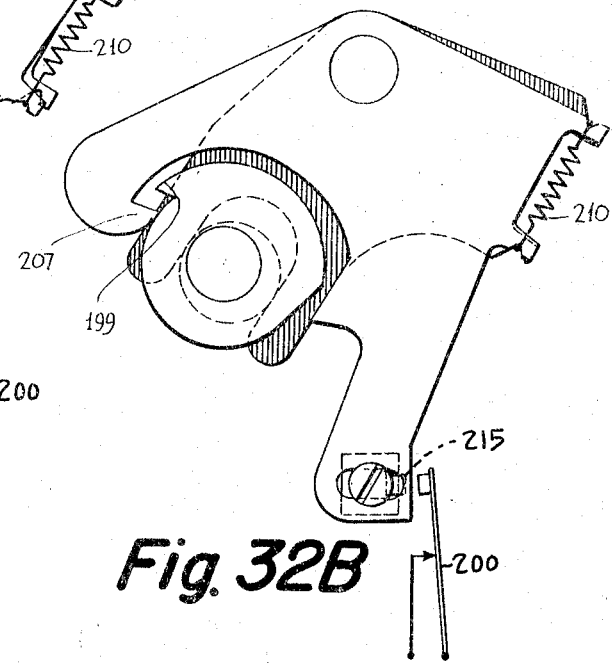

FIG. 27 is an exploded view showing components of the cam-operated switch of FIG. 12;

FIGS. 28 and 29 are front elevational views, on enlarged scale, of the cam and cam-plate pairs shown in FIG. 27;

FIG. 30 shows time/motion curves referred to in discussion of the mechanism shown in FIG. 27;

FIGS. 31A and 31B respectively show the relative position of the cams and cam plates of FIG. 27 immediately before and after opening of the associated switch; and FIGS. 32A and 32B respectively show the relative position of the cams and cam plates of FIG. 27 immediately before and after closing of the associated switch.

Referring to FIGS. 1, 5, 6 and 10, the print wheel 10 is mounted on the reciprocable recorder carriage 16 for pivotal movement about axis 13 toward and from the recorder chart 18. Specifically, the print wheel 10 is carried by the print arm 12 with the axis of rotation 11 of the print wheel parallel to the pivotal axis 13 of the print arm. The print wheel 10 is periodically swung bodily about the printing axis 13, as by the continuously rotating cam 19, for printing engagement with the chart. A motor, not shown, drives the chart via chain 33.

Figure 2A:
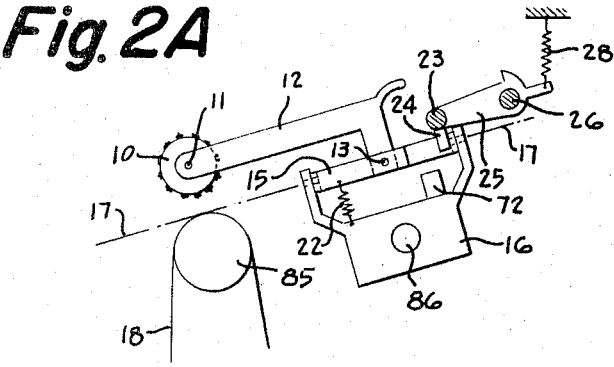
FIGS. 2A–4B are detail schematic figures referred to in explanation of printing of dots only (FIGS. 4A, 4B); printing of dots with one series of point-identification numbers (FIGS. 3A, 3B); and printing of dots with a second series of point-identification numbers (FIGS. 2A, 2B)
Figure 2B:
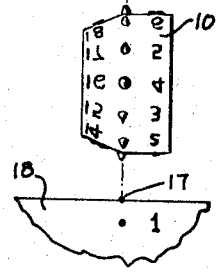

The print wheel 10 has two peripheral rows of point-identification symbols or markers 21A, 21B, one row on each side of the row of dot-markers 20. With the axis of shaft 11 parallel to the printing line of the chart (FIGS. 2A, 2B), the point-identification markers 21A (numbered, for example, from 1 to 12) on the cylindrical section of print wheel 10 are successively presented to the chart 18 for printing concurrently with the associated dot. With the axis of shaft 11 inclined at angle $\beta$ (FIGS. 3A, 3B) to being the conical section of print wheel 10 parallel to the printing line, the point-identification markers 21B (numbered, for example, from 13 to 24) are successively presented to chart 18 for printing concurrently with the associated dot. For the intermediate angle of inclination $\alpha$ of print wheel 10 (FIGS. 4A and 4B), only the dot markers 20 are successively presented to chart 18 for printing. To permit selection of any of these three angles of inclination of axis 11 of print wheel 10, the pivotal axis 13 of print arm 12 is supported by the yoke or frame 15 which in turn is mounted on carriage 16 for pivotal movement about the tilt axis 17 which is at right angles to the printing axis 13. The frame 15 is biased, as by spring 22, into the path of the tilt-bar 23 which extends parallel to the path of travel of the recorder carriage 16. The bar 23 is attached, as by arms 25, to the tilt shaft 26 movable to different angular position (FIGS. 2A, 3A, 4A) respectively corresponding with the different angles of inclination of the print wheel axis 11. Specifically, the tilt angles of shaft 11 in the specific recorder under discussion are 0°, 10° and 20°. The tilt shaft 26 is supported at its opposite ends by the side frames 32A, 32B of the recorder. The right-hand end of shaft 26 (FIG. 21) extends through the corresponding side frame 32B for connection to the tilt control or print-selector mechanism 14 shown in detail in FIGS. 12 and 13 and later fully described.

The mechanism for rotating the print wheel 10 about its axis to the successive printing positions is most clearly shown in FIG. 5. The elongated pinion 45 (FIGS. 1, 5) extends between the side frames 32A, 32B parallel to the path of travel of recorder carriage 16 and is continuously rotated as via sprocket 46, chain 47 and sprocket 48 from a small clock motor 50. The pinion 45 is continuously in sliding mesh with gear 51 which is supported by the tilt frame 15 of recorder carriage 16. The gear 51 is coupled to or integral with gear 53 which drives gear 54 on sleeve 55 which is free to rotate on the print arm shaft 13. The gear 56 also attached to sleeve 55 thus continuously rotates about the pivotal axis 13 of the print arm 12. The gear 57, as coupled by key 58 to print wheel 10, is driven from gear 56 by the gears 59, 60 carried by print arm 12.

The rotation of print wheel 10 about its axis 11 is so timed with respect to its periodic swinging movement about the printing axis 13 that the latter occurs as successive pairs of markers in the rows 21A, 21B in turn arrive opposite the printing line of the chart 18. In the particular arrangement shown, the cam 19 is of two-lobe construction and is directly coupled to or integrally formed with gear 51. The gearing from gear 51 to the print wheel 10 is such that the point wheel is advanced, for the 24-point recorder under discussion, 30° about its axis 11 in the interval between successive rocking motions imparted to the print arm 12 via its extension 61 by the lobes of cam 19.

As more fully discussed in the aforesaid application Ser. No. 277,995, the differential action occurring between gear 56 and the gears 57–60 when arm 12 is rocked about the axis of gear 56 is phased to minimize or eliminate blurring of the printing and sufficient back-lash is provided in the gear train to insure that rotation of print wheel 10 is temporarily interrupted as arm 12 is released from cam 19 for movement of the print wheel toward the chart.

As best shown in FIG. 6, the print arm 12 is biased to a neutral position for which the print wheel 10 is out of contact with the chart 18 by an arrangement comprising: (a) the stop plate 75 adjustably fastened to the bracket extension 66 of frame 15; (b) the scissors arms 76A, 76B individually free to rotate on shaft 13; and (c) a biasing spring 77 interconnecting the free ends of the scissors arms. The arms 76A, 76B, is biased by spring 77, normally respectively engage the upper and lower faces of stop 78 formed by the inturned free end of plate 75. The print wheel shaft 11, or an equivalent stop on arm 12, extends between arms 76A, 76B so that the normal angular position of print arm 12 about printing axis 13 corresponds with that of the stop 78. The slot 79 in stop plate 75 permits a nice adjustment of such neutral position of print arm 12 and the clamping screw 80 provides for maintenance of such adjustment.

When the print arm 12 is swung upwardly by engagement of its tail extension with a lobe of cam 19, the print wheel shaft 11 lifts the upper scissors arm 76A from stop 78 and so stores energy in the biasing spring 77. When cam 19 releases the print arm, the stored energy of the spring impels the print wheel 10 back to the neutral position for which the upper scissors arm 76A re-engages stop 78. However, because of its inertia, the print wheel 10 over-travels the neutral position for momentary printing contact with chart 18. During this over-travel, the shaft 11 of the print wheel forces the lower scissors arm 76B downwardly from engagement with stop 78 to store energy in spring 77 for return of arm 17 and the parts thereon to neutral position after printing. To insure clear printing of point-identification symbols plus dots requires storage of appreciable energy in spring 77 during the upstroke or cocking movement of print arm 12. That same magnitude of energy is excessive for printing of dots only (FIGS. 4A, 4B), the printing being blurred if the facing of print wheel is resilient, and may, for metal-faced print wheels, cause perforation of the chart 18, damage to the dot markers and/or the surface of the chart roll 85. To overcome these problems, the lower scissors arm 76B is shaped to provide an extension 160 (FIGS. 6, 7A–9A) and a resilient stop 161 is attached to the recorder carriage 16 as by the screws 162.

With the frame tilted to the 10° or α position for printing of dots only, the inturned tip of stop 161 is in the path of extensions 160 of the lower scissors arm 76B and consequently is engaged by it (FIGS. 7A, 7B) just as a dot marker 20 engages the chart. Thus, the resilient stop 161 absorbs part of the impact energy and so cushions the printing blow when a dot only is being printed.

With the frame 15 tilted to the 20° angle position for printing from row 21B of point-identification symbols, the path of movement of extension 160 of the lower scissors arm 76B is beyond the tip 164 of the stop 161 (FIGS. 8A, 8B). In consequence, the stop 161 has no effect and the full force is applied in printing of any of the point-identification symbols Nos. 13 to 24. It may here be noted that the 20° tilt angle of print wheel axis 11 is determined by the adjustable stop 72 (FIG. 3A) on carriage 16 toward which the tilt frame is biased by spring 22. Adjustment is afforded by a slot and clamping screw arrangement not shown.

With the frame 15 tilted to the 0° tilt angle for printing from the row 21A of point-identification symbols, the path of movement of extension 160 of the lower scissors arm 76B is below the tip 164 of stop 161 (FIGS. 9A, 9B). In consequence, the stop 161 has no effect and the full printing force is applied in printing of any of point-identification symbols Nos. 1 to 12. It may here be noted that the 0° tilt angle of axis 11 is determined by the adjustable stop 71 (FIGS. 2A, 10) toward which one of the tilt arms is biased by spring 28. The stop 71 is adjustably fastened to side frame 32A as by screw 73.

As in the earlier applications above identified, the upward motion of the print arm 12 from its normal or neutral position may be utilized for effecting periodic engagement of the print-wheel markers with the inking wheel 65 (FIG. 6). Specifically, the tilt frame 15 has a vertically extending arm 66 which supports the inking wheel 65 for rotation about an axis parallel to axis 13 of print arm 12. The inking wheel 65 is coupled to gear 67 and rotates with it on the stud shaft 68 extending from bracket 66. The gear 67 is in mesh with one of the gears carried by print arm 12 and so is driven in synchronism with print wheel 10. The slot 69 in bracket 66 permits adjustment of the position of shaft 68 for sufficient inking pressure: the clamping nut 70 holds shaft 68 in adjusted position. For single-color printing, the inking wheel 65 may simply be a roll impregnated with ink for multi-color printing; it may be of metal with radial sectors each filled with a pad of corresponding shape and saturated with ink of color assigned to identify a corresponding measuring point. Different types of inking wheels may be interchangeably mounted on shaft 68.

FIGS. 5 to 7 show in detail a print-holdout arrangement including the holdout pawl 38. The upper portion of pawl 38 is U-shaped to provide spaced bearings receiving stud shaft 81 which extends from the vertical extension or arm 66 of tilt frame 15. The lower portion of pawl 38 extends adjacent the tail member 82 of arm 12 (FIG. 5). When the tilt bar 23 is moved to the print-holdout position, as by energization of solenoid 40 (FIG. 10), the pawl 38 is moved to the position shown in FIG. 7 for which the extension 61 of arm 12 is held out of the path of the print cam 19. Suitable circuitry for controlling energization of the print-holdout solenoid 40 is shown in the aforesaid applications Ser. Nos. 277,995 and 402,215. It is to be understood that when printing is suspended, the recorder continues to serve as an indicating instrument: the pointer 116 attached to the recorder carriage 16 (FIG. 6) continuously cooperates with the scale 118 for monitoring of the measuring points whether or not printing occurs. The recorder carriage 16 is guided for travel parallel to the axis of the chart roll 85 (FIGS. 1, 6, 10) which extends between the recorder side frames 32A, 32B. The upper face of the carriage is provided with an upwardly extending stud 88 which slidably and rotatably receives a bearing member 89 of nylon or similar low-friction material. The elongated pinion 45 passes through this bearing and so serves as a second track or guide bar parallel to guide bar 86 for maintaining the carriage 16 in a fixed plane during its travel transversely of the recorder chart 18.

Figure 3A:
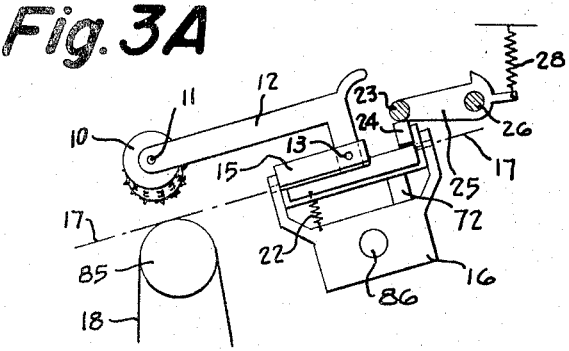
Figure 3B:
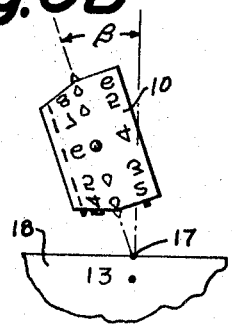

With the carriage 16 so slidably mounted, the gear 51 carried by the tilt frame 15 is maintained in mesh with the elongated pinion 45 (FIGS. 5, 11) for continuous drive to the print wheel 10. The gear 51 is so positioned on its shaft in relation to the tilt axis 17 of frame 15 that the gear remains in mesh (FIG. 11) with pinion 45 whether the frame 15 be positioned for printing of dots only (FIGS. 4A, 4B), for printing of dots with point-identification from the marker row 21A (FIGS. 2A, 2B) or for printing of dots with point-identification from the marker row 21B (FIGS. 3A, 3B).

As shown in FIG. 10, the recorder carriage is coupled to a slidewire shaft 90 by a conventional drive including cord 91, guide pulleys 92 and drum 93. As the slidewire 95 is adjusted by motor 87 to rebalance the associated measuring network 150, the carriage 16 is moved to a rest position transversely of chart 18 which corresponds with the magnitude of the variable then being measured at the selected point.

Assuming, by way of example, that the recorder is to be used for recording temperature at 24 measuring points in a system or process, the corresponding temperature-responsive devices, for example $T_1$-$T_{24}$, can be sequentially connected in the measuring circuit 150 under control of the 12-point selector switch 97 (FIG. 10) synchronized as later described, with rotation of print wheel 10 about axis 11. For clarity of illustration, only two of these thermocouples are shown in FIG. 10. As each thermocouple is in turn connected in circuit with the potentiometer slidewire 95, the difference of the opposed voltages respectively produced by the thermocouple and the slidewire and as appearing in the input circuit of amplifier 93 causes energization of motor 87 in sense to effect a rebalancing adjustment of slidewire 95. This rebalancing at each measuring point is effected within a brief interval so that the carriage 16 is normally at rest for printing of a dot, or a dot plus a point-identification symbol, before the input-selector switch 97 is effective to cause connection, in circuit with the slidewire, of the thermocouple associated with the next measuring point.

The movable contact 99 of the input selector switch is driven via gear train 101–106 (FIG. 10) from the pinion 45 which, as previously noted, drives the print wheel continuously. The gear 101 is attached to the extension shaft 107 of pinion 45 and is in mesh with gear 102, which together with gear 103, is attached to a sleeve 108 rotatably supported on tilt shaft 26. Gear 103 is in mesh with gear 104. Gear 105 is in mesh with gear 104 and also with gear 106 which is attached to shaft 110 of the input selector switch 97. The speed ratio of the whole gear train 101–106 is such that one revolution of switch shaft 110 occurs for one revolution of print wheel 10. The phasing of the movable contact 99 of switch 97 is such that it passes from one point to the next immediately after printing of the measurement for said one point.

The ratio of the gears 101–105 is such that one revolution of gear 105 corresponds with two revolutions of print wheel 10. As later explained in discussion of FIGS. 10, 18, 19, the rotation of cam 167 with gear 105 is used to effect transition from printing of the point-identification symbols of row 21A to printing of symbols of row 21B, and vice versa.

In the 24-point recorder under discussion, the ratio of gears 101–104 is such that one revolution of cam 29 (FIGS. 10, 12, 13) corresponds with 750° of rotation of print wheel 10 about its axis of rotation 11 (i.e., 25 printing operations). The cam 29 adjustably attached to gear 104 by screws 34 (FIGS. 10, 12, 13) is so phased that its notch 30 is opposite to the cam-follower 31 attached to arm 27 when print wheel 10 is in proper angular position about its axis 11 for printing. The cam 113 attached to the pinion shaft 107 is primarily provided to rock the cam-follower 31 nearly out of the notch 30 of cam 29 upon completion of printing of a point-identification symbol from either row 21A or 21B. For such purpose, the cam 113 engages the adjustable extension 165 of cam-follower 31. The cam 29 completes the liftout and restores the tilt bar 23 to the dot-printing position after each printing of a dot plus point-identification. Additionally, the cam 113 is so shaped that it controls the rate at which cam-follower 31, as biased by spring 166, drops into the notch 30 of cam 29 so to avoid jarring of the printing mechanism on carriage 16.

Figure 20:
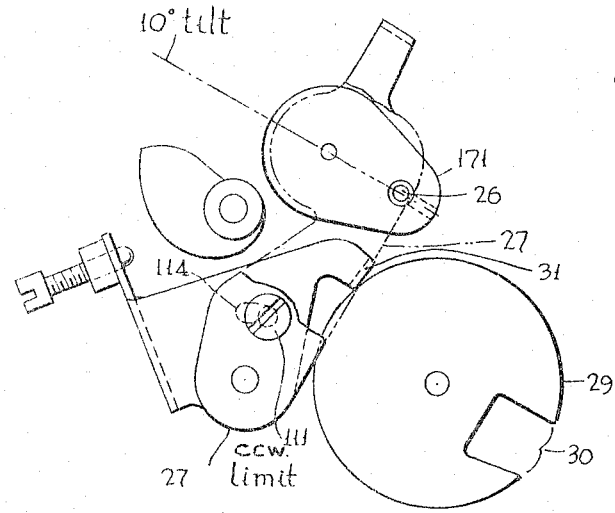
Figure 21:
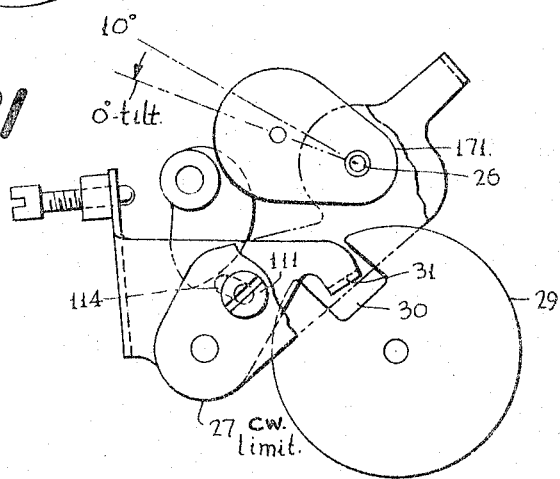
Figure 22:
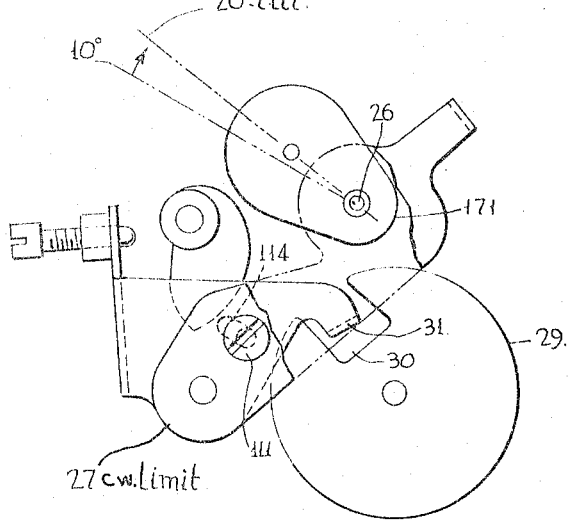

The coupling between tilt shaft 26 and cam 29 includes (FIGS. 12, 13) the arm 27 to which the cam-follower 31 may be fastened by the clamping screw 111 in the position shown in FIGS. 20–22; the arm 168 whose slot 169 receives the inner end of pin 170 as extending through arm 27; and the arm 171 which is fastened, as by set screw 172, to tilt shaft 26. The arm 27 is pivotally mounted on the outer end of a stud shaft 173 fastened at its inner end to side frame 32B of the recorder. The large rounded end of arm 168 is pivotally received by the recess 174 in arm 171.

Figure 4A:
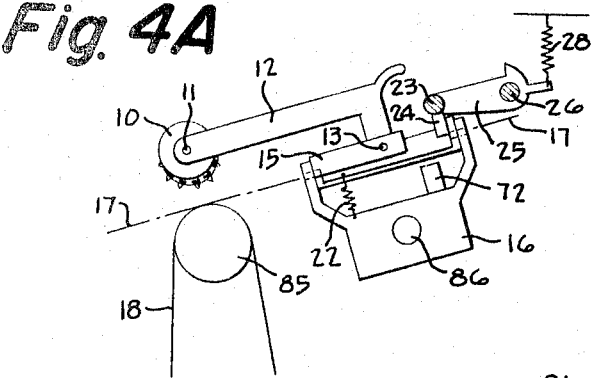
Figure 4B:
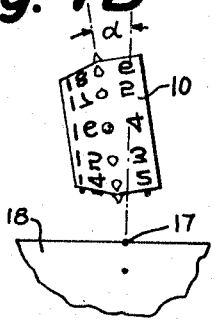

The arm 27 is biased by spring 166 for movement in clockwise direction from its counterclockwise limit. Arm 27 is held captive at its counterclockwise position by engagement of cam-follower 31 with the circular perimeter of cam 29 and by engagement of pin 170 of arm 27 with the large end of slot 169 in arm 168 (FIG. 16). With arm 27 in this position, the arm 171 is fastened to tilt shaft 26 while that shaft, as biased by spring 28, is held in the angular position corresponding with the 10° tilt or dot-printing position of print wheel 10 (FIGS. 4A, 4B). For all subsequently discussed operations of the recorder, the arm 171 remains fastened to tilt shaft 26 in the position so determined.

To adapt the recorder always to print dots only, the screw 175 which clamps the print-selector plate 176 to side frame 32B, is loosened and the plate 176 is swung about pivot 188 to the full-line position shown in FIG. 17 where it is there clamped by re-tightening of screw 175. The bent end 177 of plate 176 is thus brought into engagement with bushing 178 of plate 112 and so holds arm 27, as clamped to plate 112, in the counterclockwise limit position. With arms 27 and 171 so locked against movement by biasing spring 166, the cam-follower 31 cannot drop into notch 30 of cam 29: consequently, printing of a dot plus a point-identification symbol is precluded.

It is to be noted that for the counterclockwise limit position of arm 27, the intermediate arm 168 simply serves as an enlargement of the inner end of pivot 170, and, consequently, the angular position of arm 168 has no effect upon the angular position of the tilt bar arm 171.

To adapt the recorder to print a succession of dots with occasional periodic printing of a dot with a point-identification symbol, the screw 175 is loosened and the selector plate 176 is swung to the dotted-line position shown in FIG. 17 where it is held by re-tightening of screw 175. With the selector plate 176 in this position, the arm 27 is free to swing to its clockwise limit position under the bias of spring 166 when the cam-follower 31 drops into notch 30 of cam 29. Whether such clockwise movement of arm 27 results in clockwise or counterclockwise movement of tilt arm 171 from the 10° reference position, depends, as below described, upon the angular position of the intermediate slotted arm 168.

As shown in FIGS. 12, 13, a pin 179 projecting from the free end of arm 168 is received by slot 180 in the upper end of a lever 181 which is pivotally mounted intermediate its ends on the outer end of a stud shaft 182. The inner end of shaft 182 is fastened to the side frame 32B of the recorder. The lower end of lever 181 is provided with a cam-follower 183 for engagement by the row-selector cam 167 attached to or integral with gear 105 of the timing train 101–106.

When notch 30 of cam 29 comes into alignment with the cam-follower 31, the arm 27 is swung by spring 166 to its clockwise limit position (FIGS. 18, 19) with pin 170 of arm 27 bottoming in the small end of notch 169 of arm 168 and in alignment with the tilt shaft 26. If during such movement of arm 27 the sector 167B of selector cam 167 is opposite cam-follower 183, the spring 28 (FIG. 10) is effective to move the tilt bar 23 to the 0° tilt position (FIG. 2A) of the print wheel 10 as defined by stop 71 on recorder frame 28A. Under this circumstance, the position of arms 168, 171 and 181 is substantially as shown in FIG. 18. If, however, when arm 27 is swung to its clockwise limit position the cam sector 167A of cam 167 is opposite the cam-follower 183, the arm 171 on tilt shaft 26 is swung clockwise to the position shown in FIG. 19 against the bias of spring 28 so that the biasing spring 22 (FIG. 3A) is effective to move the axis 11 of print wheel 10 to the 20° tilt position as defined by stop 72 on carriage 16.

For adapting the recorder mechanism to print a succession of dots with occasional timed printing of one of the symbols, Nos. 1 to 24, in sequence, the plate of cam-follower 31 is clamped to arm 27 in the position shown in FIGS. 20–22 with the clamping screw 111 toward the right-hand end of slot 114. For the counterclockwise limit of motion of arm 27, as established by cam 29 and cam-follower 31 (FIG. 20), the arm 171 fastened to the tilt shaft 26, as above described, is in angular position corresponding with the 10° tilt of the print-wheel axis for printing of a dot only (FIGS. 4A, 4B). For this relative setting of arm 27 and cam-follower 31, when the cam-follower drops into notch 30 of cam 29, the arm 171 on tilt shaft 26 will swung from the 10° tilt position either to the 0° tilt position (FIG. 21) or to the 20° tilt position (FIG. 22) as above described. The cam-follower 183, FIG. 13, instead of being integral with arm 181 is a separate arm clamped to arm 181 by screw 184 which extends through slot 185. This adjustment is provided to insure that stop 72 on the recorder carriage 16, rather than the sector 167A of cam 167, determines the 20° tilt position of the print wheel.

Figure 23:
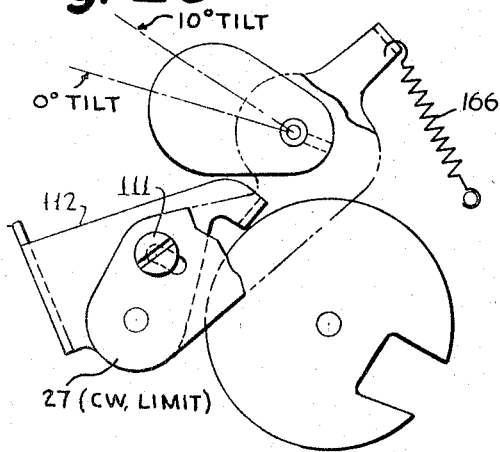
Figure 24:
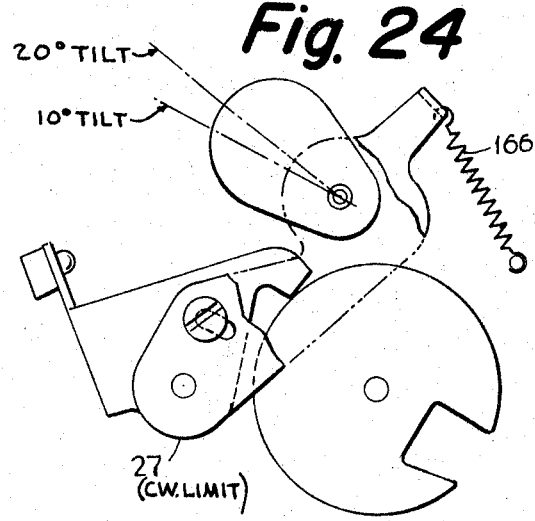

For adapting the recorder mechanism to print dots continuously with point-identification Nos. 1 to 24, the cam-follower plate 112 is unclamped from arm 27 by loosening screw 111 so that spring 166 may move arm 27 to the different clockwise limit position shown in FIGS. 23 and 24. With arm 27 at such clockwise limit of its motion, the arm 171 is in angular position corresponding with the 0° tilt position of the print wheel axis 11 (FIGS. 2A, 2B) when cam sector 167B is opposite cam-follower 183 (FIG. 18) and is in the 20° tilt position when cam sector 167A is in contact with cam-follower 183 (FIG. 19).

To adapt the recorder mechanism for 2-point, 3-point, 4-point, 6-point or 12-point operation, the cam arm 181 is disengaged (FIG. 25A) from the pin 179 of the intermediate arm 168 so that the tilt shaft is moved only between the 0° and 10° positions (FIGS. 25A, 25B). For printing of dots only for any of these types of operation, the plate 176 is locked in the full-line position shown in FIG. 17 and arm 27 is clamped to plate 112 in the position shown in FIGS. 20 and 21. For printing of dots continuously with the Nos. 1 to 12, the cam arm 181 is disengaged (FIG. 25B) and the cam-follower plate 112 is unclamped from arm 27 (FIG. 23). For 2-point, 3-point, 4-point or 6-point operation, an appropriately different print wheel is substituted for the 24-point print wheel shown: for example, for 3-point operation, the sequence of Nos. 1 to 3 would repeat four times around the circumference of the print wheel.

Suitable circuitry associated with input-selector switch 97 of the recorder for 24-point, 12-point, 6-point, 4-point, 3-point or 2-point operation is shown in FIG. 26. Twelve fixed contacts of the synchronizing switch 97 are respectively connected to the movable contacts of a twelve-pole, double-throw relay 190. For 24-point operation of the recorder system, the normally-closed contacts of relay 190 are connected via connector 191A to the contact group 192A of an input relay-card 193A and the normally-open contacts of relay 190 are connected via connector 191B to the contact group 192B of a second input relay-card 193B. For 12-point, 6-point, 4-point, 3-point or 2-point operation, the switch 24 is left in open-circuit position effectively to disable the cam-operated switch 200 and the connector 191A is plugged to the corresponding one of the other groups of contacts 192A–6, 192A–4, 192A–3, 192A–2 of the input relay card 193A.

Thus, with relay 190 deenergized (FIGS. 10, 26), the input relays K1–K12 are, in succession, energized as the movable contact 99 of the input-selector switch 97 successively engages the twelve fixed contacts of that switch. As each of input relays K1–K12 is energized, the corresponding one of transducers $T_1$–$T_{12}$ is connected into the slidewire circuit 150.

With relay 190 energized (FIGS. 10, 26), the input relays K13–K24 are, in succession, energized as the movable contact 99 of switch 97 successively engages the twelve fixed contacts of that switch. As each of input relays K13–K24 is energized, the corresponding one of transducers $T_{13}$–$T_{24}$ is connected into the measuring circuit 150.

When the recorder is to be used for alarm or control purposes, the commutating relays KC1–KC12 are respectively connected in shunt to the input relays K1–K12 via cable 194A and contacts of commutator relay-card 195A: the commutating relays KC13–KC24 are similarly respectively connected in shunt to the input relays K13–K24 via cable 194B and contacts of commutator relay-card 195B. The contact of each commutator relay jointly with a high-low switch, cam-operated from the slidewire shaft 90 of the recorder, are used for alarm or control purposes: various alarm and control circuits of this type are described in the aforesaid copending application, Ser. No. 352,382. FIG. 10 hereof for clarity shows only one cam-operated high-low switch 196.

For 24-point operation, the switch 24 (FIG. 26) is left in closed-circuit position so that relay 190 is energized and deenergized under control of switch 200 as effected by cams 201, 202 (FIGS. 10, 27) which are rotatable with gear 105 of the recorder. The cams 201, 202 respectively individually control the angular position of the cam-follower plates 203, 204 with respect to their common pivotal axis as provided by stud shaft 205 fastened to the side frame 32B of the recorder. The cam 201 is of circular perimeter eccentric to the axis of rotation and is received by the forked end 206 of cam-follower plate 203 (FIGS. 27, 28). The cam 202 has two base radii having a single high point 199 and is engaged by the pawl cam-followers 207, 208 of plate 204. The linear distance between the pawl and tips closely matches the sum of the base radii of cam 202. To the leg 209 of plate 204 is adjustably fastened a small permanent magnet 215. When plate 204 is moved counterclockwise to a position for which magnet 215 is sufficiently close to the magnetic reed of switch 200, the normally-open contacts of switch 200 move to closed-circuit position: conversely, when plate 204 is swung clockwise away from switch 200, the magnet 215 releases the contacts of switch 200 for movement to open-circuit position.

The upper end of spring 210 is looped over the upper ears 211, 212 of plates 203, 204 respectively and the lower end of spring 210 is looped under the lower ears 213, 214 of those plates. For each revolution of cam 201, the plate 203 makes one complete sine-wave cycle (curve A, FIG. 30) between the clockwise and counterclockwise limits of its motion to tension the spring 210. For each revolution of cam 202, the plate 204 abruptly moves to its clockwise limit position, remains there for a half-revolution of cam 202, abruptly moves to its counterclockwise limit position, and there remains for the next half-revolution of cam 202 (curve B, FIG. 30).

Specifically, for the angular position of cams 201, 202 shown in FIG. 31A, the plate 203 is at the clockwise limit of its motion and the plate 204 is at the counterclockwise limit of its motion with switch 200 in closed-circuit position: the bias of spring 210 is applied between the upper ear 212 of plate 204 and the lower ear 213 of plate 203. Within the next few degrees of cam motion, the pawl 208 rides off the high-point 199 of cam 202 and the plate 204 is quickly swung by spring 210 to the clockwise limit of its motion (FIG. 31B). In consequence, the magnet 215 is abruptly pulled away from switch 200 to open it.

Specifically, for the angular position of cams 201, 202 shown in FIG. 32A, the plate 203 is at the counterclockwise limit of its motion and the plate 204 is at the clockwise limit of its motion with switch 200 in open-circuit position: the bias of spring 210 is now applied between the upper ear 211 of plate 203 and the lower ear 214 of plate 204. Within the next few degrees of cam motion, the pawl 207 rides off the high point 199 of cam 202 and the plate 204 is abruptly swung by spring 210 to the counterclockwise limit of its travel (FIG. 32B). In consequence, the magnet 215 is quickly moved toward switch 200 to close it.

As stated above, contact 99 of synchronizing switch 97 should pass from one fixed contact to the next immediately after a printing operation. Unless the switch 200, as controlled by cams 201, 202, changes its state precisely at 180° intervals and in proper synchronization with movement of contact 99, there is an interval for which the transducer in the measuring circuit during transition from point No 12 to point No. 13 and from point No. 24 to point No. 1 does not correspond with the printed point-identification. To avoid the consequent transient erroneous measurement, the axis of rotation of plates 203, 204 is adjusted toward and from the axis of rotation of cams 201, 202 so that the points at which the pawls 207, 208 respectively drop off the cam are exactly 180° apart on the circle described by the cam high point 199. Specifically, such adjustment may be afforded by offsetting from the axis of stud shaft 182 the hole which receives the screw for clamping it to the recorder frame 32B. The enlarged concentric portion 186 of the stud shaft 182 forms the mounting for plates 203, 204.

It is to be noted that the fixed relation of cams 167 and 202 is such that the change of state of switch 200 coincides with the appropriate change in position of the cam-follower 183 of the print-selector mechanism. Once the aforesaid 180° symmetry of operation of switch 200 is obtained, the body of switch 97 may be angularly shifted with respect to its operating shaft 110 properly to phase the action of switches 97 and 200. Then the print wheel 10 is phased, as by shifting the angular relation in which gear 101 is coupled to pinion 45, so that printing is completed before the movable contact 99 of switch 97 passes from one to the next fixed contact.

It is to be understood that the invention is not limited to the preferred embodiment disclosed and described herein, but comprehends modifications and equivalents within the scope of the appended claims.

What is claimed is:
1. A multi-point recorder comprising
 a carriage movable transversely of a recorder chart,
 a rotatable print wheel supported from said carriage for positioning of its axis of rotation in any of at least two angular positions with respect to a tilt axis and for rocking motion toward the chart about a printing axis while in any of said angular positions,
 said print wheel having two peripheral rows of equally angular-spaced point-identification markers respectively on opposite sides of said tilt axis,
 first print-selector means normally effective during revolutions of the print wheel about its axis of rotation alternately to preset the axis of rotation of the print wheel in first one and then the other of said two angular positions, and
 means for periodically rocking said print wheel about said printing axis alternately to print point-identification symbols first in predetermined sequence from one row of said point-identification markers and in subsequently predetermined sequence from the other row of said point-identification markers.

2. A multi-point recorder as in claim 1
 in which said print wheel additionally has a peripheral row of equally angularly-spaced dot markers, each intermediate a pair of said point-identification markers and in line with said tilt axis,
 and which additionally includes
 a second selector means normally effective during revolutions of the print wheel to maintain the print wheel axis in a third angular position intermediate said two angular positions for printing of dots only and normally effective at predetermined times to permit said first print-selector means to preset the axis of rotation of the print wheel to one or the other of said two angular positions.

3. A multi-point recorder as in claim 1 additionally including
 print-holdout means for precluding rocking of the print wheel about the printing axis, and
 means movable with the carriage for monitoring purposes.

4. A multi-point recorder as in claim 2 additionally including
 means for retaining said second selector means in state for which the print wheel axis is in said third angular position to adapt the recorder for printing of dots only.

5. A multi-point recorder as in claim 2 additionally including
 means for disabling said first print selector means,
 said second selector means then being normally effective during revolutions of the print wheel to maintain the print wheel axis in said third angular position for printing of dots only and normally effective at predetermined time to set the axis of rotation of the print wheel always to one of said two angular positions.

6. A multi-point recorder as in claim 1 additionally including
 a first selector switch having movable contact structure driven in synchronism with rotation of the print wheel and having fixed contacts in number corresponding with the markers per row of the print wheel, and a second selector switch operated to be in opposite circuit-control positions for alternate cycles of rotation of the print wheel.

7. A multi-point recorder as in claim 6 additionally including a relay controlled by said second selector switch and having normally-closed contacts for respectively connecting the measuring-point circuits of one group to the fixed contacts of said first selector switch and having normally-open contacts for respectively connecting the measuring-point circuits of another group to the fixed contacts of said first selector switch.

8. A multi-point recorder as in claim 7 additionally including switch means which for one state inhibits control of said relay by said second selector switch to adapt the recorder for one group of measuring-point circuits and which for another state restores control of said relay to said second selector switch to adapt the recorder for two groups of measuring point circuits.

9. A multi-point recorder as in claim 6 in which the actuating means of said second selector switch provides abrupt transition from each one to the other of its circuit positions in precise time relation to movement from one fixed contact to the next of the movable contact structure of said first selector switch.

10. A multi-point recorder as in claim 2 additionally including means for cushioning the printing impact of the print wheel with the chart when the print-wheel axis is in angular position corresponding with printing of dots only.

11. A multi-point recorder comprising a carriage movable transversely of a recorder chart, a rotatable print wheel supported from said carriage both for annular positioning of its axis of rotation with respect to a tilt axis and for rocking about a printing axis toward the chart, said print wheel having two peripheral rows of equally angularly-spaced point-identification markers and an intermediate row of dot markers, means for biasing the axis of rotation of the print wheel to a first angular position corresponding with printing of a dot with a symbol from one row of point-identification markers, a tilt shaft coupled to effect movement of the print wheel from said first angular position, means for biasing said tilt shaft to a position for which the print wheel is in a second angular position corresponding with printing of a dot with a symbol from the other row of point-identification markers, a tilt control arm attached to said tilt shaft, and print-selector mechanism for controlling the angular position of said tilt-control arm including a first cam rotating in time relation to said print wheel and having a sector of constant radius which corresponds with two revolutions of the print wheel and a notch of angular extent corresponding with the angular spacing between two adjacent markers, a first cam-follower, a first pivoted arm coupled to said first cam-follower and to said tilt-control arm, means for biasing said first pivoted arm from a position for which said first cam-follower engages said sector of said first cam normally to maintain said tilt shaft in position for which the axis of rotation of the print wheel corresponds with printing of dots only, a second cam rotating in timed relation to the print wheel and having sectors of different radii, said sectors being respectively of angular extents each corresponding with one row of markers, a second cam-follower operable by said second cam, and a second pivoted arm normally coupled to said second cam-follower, said second pivoted arm having a fixed pivotal connection with said tilt-control arm and having a pin-and-slot pivotal connection with said first pivoted arm, said first pivoted arm moved by said biasing means when said first cam-follower is in said notch of said first cam to provide by said pin-and-slot connection a pivotal axis for said second pivoted arm for movement of said tilt shaft either to position corresponding with printing of dots with symbols from one row of point-identification markers or to position corresponding with printing of dots with symbols from the other row of point-identification markers in dependence upon which sector of said second cam is adjacent said second cam-follower.

12. A multi-point recorder as in claim 11 additionally including means for decoupling said first pivoted arm from said first cam-follower to adapt the recorder for alternately first printing a series of dots with point-identification symbols from one of said rows of point-identification markers and then a series of dots with point-identification symbols from the other row of point-identification markers, said means when recoupling said first pivoted arm to said first cam-follower adapting the recorder for printing successive series of dots only and at predetermined intervals additionally printing point-identification symbols in sequence from one row of point-identification markers and subsequently in sequence from the other row of point-identification markers.

13. A multi-point recorder as in claim 11 additionally including means for restraining said first pivoted arm in position for which the tilt-control arm is in position corresponding with printing of dots only.

14. A multi-point recorder as in claim 11 additionally including print-holdout means for precluding rocking of the print wheel about said printing axis, and means movable with said carriage for monitoring of measuring points corresponding with both rows of point-identification markers.

15. A multi-point recorder as in claim 11 additionally including means for decoupling said second pivoted arm from said second cam-follower to adapt the recorder for measuring points corresponding with one row of point-identification markers and for recoupling said second pivoted arm to said second cam-follower to adapt the recorder for measuring points corresponding with both rows of point-identification markers.

16. A multi-point recorder as in claim 11 additionally including a first selector switch having movable contact structure driven in synchronism with rotation of the print wheel and having relatively fixed contacts in number corresponding with the markers per row of the print wheel, and a second selector switch operated in synchronism with said second cam, said switch being in closed-circuit position and open-circuit position for intervals respectively corresponding with said sectors of said second cam.

17. A multi-point recorder as in claim 16 additionally including a relay controlled by said second selector switch and having normally-closed contacts for respectively connecting one group of measuring-point circuits to the fixed contacts of said first selector switch and having normally-closed contacts for respectively connecting another group of measuring-point circuits to the fixed contacts of the first selector switch.

18. A multi-point recorder as in claim 17 additionally including
switch means which for one circuit position inhibits control of said relay by the second selector switch to adapt the recorder for one group of measuring-point circuits and which for another circuit position restores control of said relay to said second selector switch to adapt the recorder for two groups of measuring-point circuits.

19. A multi-point recorder as in claim 16 in which the actuating means of said second selector switch comprises
a pair of cams having a common axis of rotation; the first of said cams being circular and having a center offset from said axis of rotation; the second of said cams having a perimeter defined by two arcuate sectors of different radii, a sharp drop-off equal to the difference between said radii, and a smooth rise from the smaller to the larger of said radii,
a pair of cam-followers having a common pivotal axis and biased by spring means to a fixed relative position, the first of said pair of cam-followers as actuated by the first of said pair of cams having sinusodial motion, and the second of said cam-followers having two pawls with spacing equal to the sum of said radii as biased by said spring means and actuated by the second of said pair of cams having square-wave motion with successive dwells respectively corresponding with open-circuit and closed-circuit states of said second selector switch.

20. A multi-point recorder as in claim 19 additionally including
means for adjusting the spacing between the common axis of rotation of said pair of cams and the common pivotal axis of said pair of cam-followers to attain continuous correspondence between the printed point-identification symbols and the measuring-point circuits.

21. A multi-point recorder as in claim 11 additionally including
resilient stop structure positioned to cushion the printing impact of the print wheel when the print wheel axis is in angular position corresponding with printing of dots only.

No references cited.

RICHARD B. WILKINSON, *Primary Examiner.*

J. W. HARTARY, *Assistant Examiner.*

UNITED STATES PATENT OFFICE
CERTIFICATE OF CORRECTION

Patent No. 3,317,913                  May 2, 1967

Albert E. Paschkis

It is hereby certified that error appears in the above numbered patent requiring correction and that the said Letters Patent should read as corrected below.

Column 2, line 68, for "being" read -- bring --; column 3, line 12, for "position" read -- positions --; line 47, for "point" read -- print --; line 68, for "is" read -- as --; column 7, line 62, for "swung" read -- swing --; column 11, line 39, for "annular" read -- angular --; column 11, line 40, for "titlt" read -- tilt --; column 13, lines 23 and 24, for "sinusodial" read -- sinusoidal --.

Signed and sealed this 29th day of October 1968.

(SEAL)

Attest:

Edward M. Fletcher, Jr.

Attesting Officer

EDWARD J. BRENNER

Commissioner of Patents